Aug. 17, 1926.
C. H. SEIBOLD
1,596,631
FOLDING FISHING GAFF
Filed Feb. 10, 1926
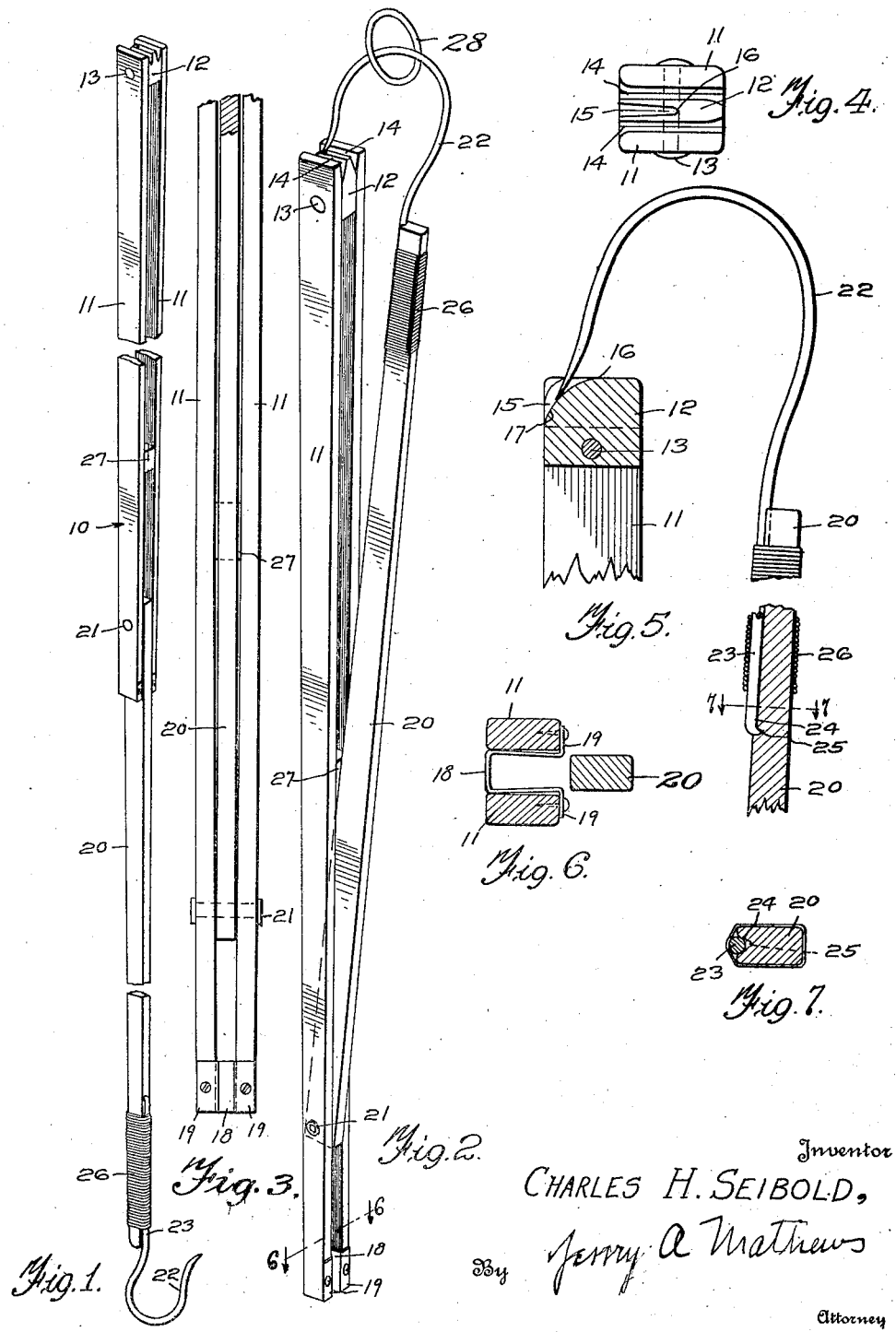
Inventor
CHARLES H. SEIBOLD,
By Jerry A. Mathews
Attorney Patented Aug. 17, 1926.

1,596,631

UNITED STATES PATENT OFFICE.

CHARLES H. SEIBOLD, OF CAMP DOUGLAS, WISCONSIN.

FOLDING FISHING GAFF.

Application filed February 10, 1926. Serial No. 87,418.

My invention relates to a folding fishing gaff.

Important objects of the invention are to provide a device of the above mentioned character, which is light, strong, durable and convenient in use; to so construct the device that the folding section is properly held in the opened and closed positions, and to provide a device of the above mentioned character which may be conveniently manipulated by one hand.

Other objects and advantages of the invention will be apparent during the course of the following description.

In the accompanying drawings, forming a part of this specification, and in which like numerals are employed to designate like parts throughout the same, Figure 1 is a perspective view of the fishing gaff showing the same open.

Figure 2 is a similar view showing the same closed,

Figure 3 is an edge elevation of the device showing the same closed,

Figure 4 is a plan view of the inner handle section,

Figure 5 is an enlarged fragmentary side elevation of the inner end of the device, showing the same closed, with parts in section, Figure 6 is a transverse section taken on line 6—6 of Figure 2, and, Figure 7 is a transverse section taken on line 7—7 of Figure 5.

In the drawings wherein for the purpose of illustration is shown a preferred embodiment of my invention the numeral 10 designates an inner handle or rod section, embodying a pair of spaced rods 11, preferably formed of wood, although other suitable material may be employed. Arranged between the inner ends of the rods 11 is a locking element or block 12, which may be formed of wood or like material. This block is rigidly secured to the inner or rear ends of the rods 11 by means of a screw 13 or the like. Formed between the end of the block 12 and the ends of the rods 11, are transverse passing grooves 14, extending to and beyond the opposite edges of the handle section. The block is provided with a holding or locking groove 15, which extends from one edge of the handle section to and terminates at a point 16, affording a shoulder or wall 17, as shown.

The opposite or forward ends of the rods 11 are connected by a resilient U-shaped stop strap 18, arranged therein, and having extensions 19, attached to the edges of the rods 11 by means of screws or the like. The numeral 20 designates an outer or forward foldable handle section, the rear end of which is positioned between the forward portion of the rods 11 and are pivotally connected therewith by means of a bolt 21 or the like. When the outer handle section 20 is shifted outwardly, at a straight angle to the inner handle section 10, Figure 1, the inner portion of the section 20 will be held within the stop strap 18, and hence the swinging movement of the outer handle section, in one direction is positively limited.

The outer or forward end of the handle section 20 is equipped with a large hook 22, having a shank 23, arranged within a groove 24, and having a tail 25 fitting in a notch in the wall of the groove. The shank is bound to the handle section 20 by cord 26 or the like. Other means may be employed to secure the hook to the forward handle section. The handle sections 11 are spaced apart, at the pivot 21, for a distance equal to substantially the thickness of the handle section 20. Rearwardly of this pivot 21, a spring block 27 is arranged between the rods 11 and is rigidly attached thereto. This spring block is slightly thicker than the handle section 20 and it serves to bow the handle section 11 outwardly slightly rearwardly of the pivot 21. As a result of this, the forward ends of the rods 11 converge slightly so that the space between the side walls of the resilient stop strap is narrower than the width of the handle section 20. When the handle section 20 is swung outwardly, it springs the inner ends of the rods 11 outwardly so that the same may enter the U-shaped stop strap 18, but the handle section has suitable clamping or frictional engagement with the side walls of the stop strap whereby it is held in the opened position, against accidental displacement in use.

The end of the spring block 27 is also arranged to be engaged by the handle section 20, when it approaches the closed position so that the handle section 20 must be slightly sprung before its hook 22 can enter the groove or recess 17 and the handle section 20 will be maintained under suitable tension when locked in the closed position. This will prevent the accidental opening of the device.

If desired, a ring 28' can be placed upon the hook 22 so that the device may be swung from the belt or the like of the operator when it is not in use.

It is to be understood that the form of my invention herewith shown and described, is to be taken as a preferred example of the same, and that various changes in the shape, size and arrangement of parts may be resorted to without departing from the spirit of my invention or the scope of the subjoined claims.

Having thus described my invention, I claim:—

1. A folding gaff comprising an inner handle section, an outer handle section pivotally connected therewith, a hook secured to the forward end of the outer handle section and adapted for detachable engagement with the rear end of the inner handle section when said handle sections are folded, and a stop element secured to the inner handle section and adapted to engage with the outer handle section to place the same under tension when in the folded position.

2. A folding fishing gaff comprising an inner handle section provided at its rear end with a groove extending entirely across the same and with a notch at one side of the groove, an outer handle section pivoted to the inner handle section, and a hook secured to the forward end of the outer handle section and adapted to be passed through said groove and to enter said notch when said handle sections are folded.

3. A folding fishing gaff comprising an inner handle section including a pair of spaced rods which normally converge forwardly, a stop element connected with the forward ends of said rods, an outer handle section pivoted between said rods rearwardly of said stop element and adapted to be frictionally held in the open position by the rods when shifted to such position, and a hook secured to the forward end of the handle section.

4. A folding fishing gaff, comprising an inner handle section including a pair of spaced rods which normally converge forwardly, a resilient U-shaped socket attached to the forward ends of said rods, a forward handle section pivoted between said rods rearwardy of and near the U-shaped socket and adapted to be moved into the same, and a hook attached to the forward end of the outer handle section.

5. A folding fishing gaff comprising an inner handle section including a pair of spaced rods which normally converge forwardly, a stop element connected with the forward ends of said rods, an outer handle section having its rear end arranged between and pivotally connected with said rods at a point rearwardly of and spaced from said stop element, the outer handle section being adapted to be held in the opened position by frictional engagement with the forward converging ends of said rods, a spring block held between the rods of the inner handle section and adapted to be engaged by the outer handle section when the outer handle section is swung to the inner or folded position, and a hook attached to the forward end of the outer handle section and adapted to be detachably engaged with the rear end of the inner handle section, said spring block serving to place the outer handle section under tension when held in the inner or folded position.

In testimony whereof I affix my signature.

CHARLES H. SEIBOLD.